(12) United States Patent
Gangadharan et al.

(10) Patent No.: US 9,426,238 B2
(45) Date of Patent: Aug. 23, 2016

(54) SYSTEM AND METHOD FOR PROVIDING SIMPLIFIED PROGRAMMING CONSTRUCTS FOR USER ACTIVITIES IN A TELECOMMUNICATIONS APPLICATION

(71) Applicant: ORACLE INTERNATIONAL CORPORATION, Redwood Shores, CA (US)

(72) Inventors: Binod Pankajakshy Gangadharan, Bangalore (IN); Cai Xia Liu, Beijing (CN); Wei Ping Hu, Beijing (CN); Tao Wang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 328 days.

(21) Appl. No.: 13/706,160

(22) Filed: Dec. 5, 2012

(65) Prior Publication Data
US 2014/0156728 A1 Jun. 5, 2014

(51) Int. Cl.
*H04L 29/06* (2006.01)
*H04L 29/08* (2006.01)

(52) U.S. Cl.
CPC ............ *H04L 67/22* (2013.01); *H04L 65/1006* (2013.01); *H04L 65/1063* (2013.01); *H04L 65/1073* (2013.01)

(58) Field of Classification Search
CPC ............ H04L 65/1006; H04L 65/1073; H04L 29/06027; H04L 12/589; H04L 12/5895; H04L 51/04; H04L 51/36; H04L 65/1016; H04L 12/2803; H04L 12/2838; H04L 12/581; H04L 65/1026; H04L 65/1033; H04L 65/1036; H04L 65/1063; H04L 65/1069; H04L 65/1096; H04L 65/4007; H04L 67/34; H04L 12/1831; H04L 12/6418; H04L 2012/6443; H04L 29/06224; H04L 51/24; H04L 61/106; H04L 29/06197; H04L 67/14; H04L 67/2804; H04L 63/0428; H04L 67/16; H04M 3/42314; H04M 7/006; H04M 1/2535; H04M 2203/4509; H04M 3/5307; H04M 1/82; H04M 2250/66; H04M 3/02; H04M 3/12; H04M 3/42136; H04M 3/4365; H04M 3/533; H04M 3/53325; H04M 3/53366; H04M 7/0069; H04M 7/0075; H04M 7/009; H04M 7/129; H04M 1/658; H04M 2201/40; H04M 2203/1091; H04M 2207/203; H04M 3/2281; H04M 3/42059; H04M 3/42153; H04M 3/42221; H04M 3/42229; H04M 3/4234; H04M 15/57; H04M 15/8228; H04M 2215/7833

See application file for complete search history.

(56) References Cited

U.S. PATENT DOCUMENTS

| | | | | |
|---|---|---|---|---|
| 2007/0121885 A1* | 5/2007 | Sin | ..................... | H04L 29/06027 379/219 |
| 2008/0127124 A1* | 5/2008 | Gilfix | ..................... | H04L 67/02 717/136 |
| 2009/0083709 A1* | 3/2009 | Millett | ..................... | G06F 8/35 717/120 |
| 2010/0317334 A1* | 12/2010 | Tai | ..................... | H04M 3/42068 455/418 |

(Continued)

*Primary Examiner* — Kevin Bates
*Assistant Examiner* — Ranjan Pant
(74) *Attorney, Agent, or Firm* — Tucker Ellis LLP

(57) ABSTRACT

In accordance with embodiments of the invention, the converged application framework of a converged application server is extended by providing a set of easily usable artifacts which enable easy creation of programs effecting user activities without detailed knowledge of the underlying SIP level protocol and events. In particular embodiments the present invention provides new communication beans implementing particular user activities including, for example, subscribing to the status of a user mailbox.

20 Claims, 3 Drawing Sheets

(56) References Cited

U.S. PATENT DOCUMENTS

2011/0113140 A1* 5/2011 Bhayani ............... G06F 9/50
                                                   709/226
2012/0159305 A1* 6/2012 Amrhein ........... G06F 17/30873
                                                   715/230
2013/0007714 A1* 1/2013 Arcese ................. G06F 8/315
                                                   717/124

* cited by examiner

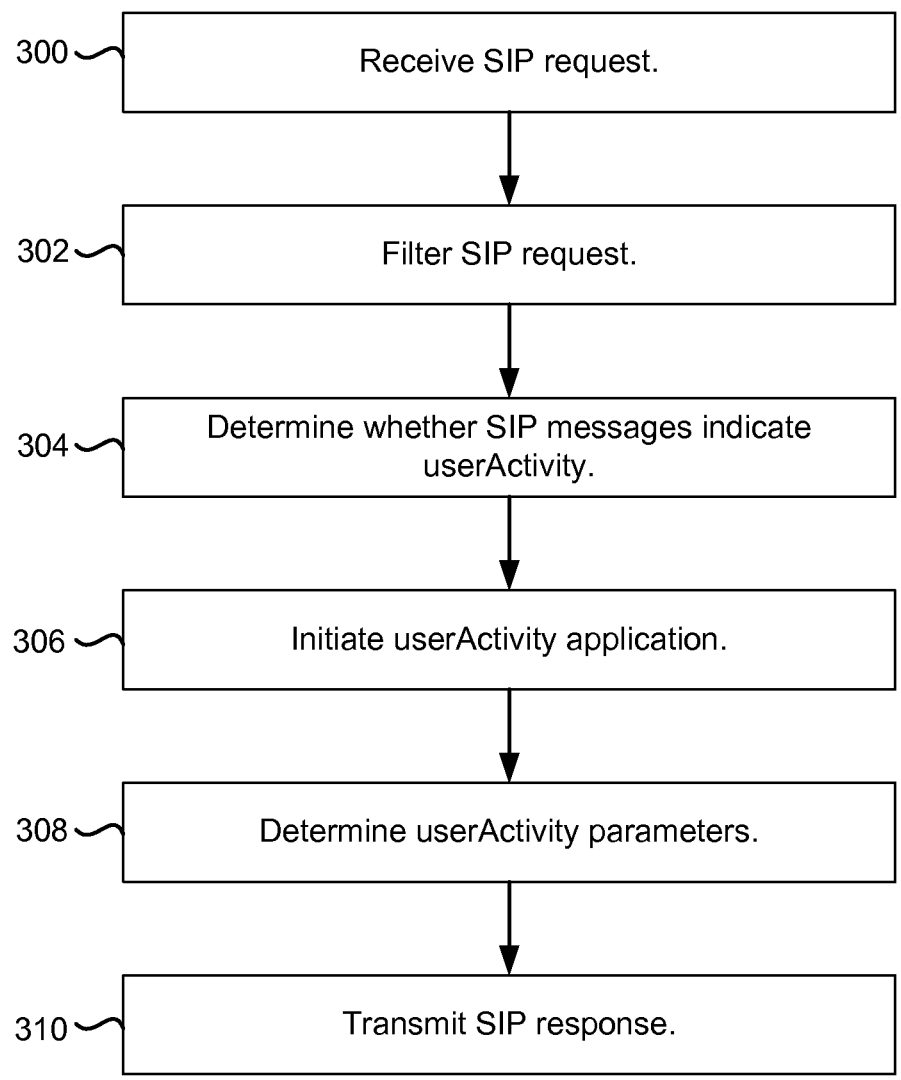

SYSTEM AND METHOD FOR PROVIDING SIMPLIFIED PROGRAMMING CONSTRUCTS FOR USER ACTIVITIES IN A TELECOMMUNICATIONS APPLICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method for providing simplified programming constructs for user activities in a telecommunications network.

BACKGROUND

With the explosive proliferation of IP-enabled mobile and fixed devices capable of offering Web, telecommunications and entertainment services (for example, 3G/4G-enabled smart phones, TVs, home appliances, gaming consoles, and automobiles) operators of mobile, broadband and fixed networks are faced with the operational and business challenges of delivering innovative IP-based communication services with maximum profitability. In order to achieve this goal, operators are increasingly migrating away from expensive, closed, proprietary and application-specific legacy platforms, and towards low-cost, open, standards-based unified converged application platforms, which dramatically lowers the time and cost of adding new features and extensions to existing IP-based communication services.

Session Initiation Protocol (SIP) is a control (signaling) protocol developed to manage interactive multimedia IP sessions including IP telephony, presence, and instant messaging. SIP is widely used in telecommunication networks. SIP however is not readily compatible with HTTP and use in the Internet domain. Moreover, SIP and other communications centric protocols are complex, and their implementation requires significant domain expertise.

SIP Servlets provide a standard Java™ (Java is a registered trademark of Oracle America, Inc.) programming language API programming model for delivering SIP-based services. SIP Servlet APIs expose the full capabilities of the SIP protocol in a Java™ and Java™ Enterprise Edition (EE) middleware solution. The SIP Servlet APIs also enable multiple applications to execute on the same request or response, independently of one another. Thus application developers can write applications providing features that are independent of each other, but can be deployed to the same host SIP Servlet container. SIP Servlet APIs thereby provide a programming model that is as well suited to meet the needs of the application developer and the operational requirements of the network operator.

SUMMARY

In accordance with embodiments of the invention, the converged application framework of a converged application server is extended by providing a set of easily usable artifacts which enable easy creation of programs effecting user activities without detailed knowledge of the underlying SIP level protocol and events. In particular embodiments the present invention provides new communication beans implementing particular user activities.

There are many use cases in which a converged application operating on multiple services/protocols is desirable. A converged application using both SIP and HTTP functions can be used, for example, for: conferencing; click-to-call applications; Presence; and User Agent Configuration Management applications. A converged telecommunication application framework is a framework designed to abstract complexities for SIP Servlets to provide a set of easily usable artifacts which enable easy creation of programs.

The SIP Servlet API is closely aligned with the Java™ EE specifications and containers that host SIP Servlet applications can also make Java™ EE features such as a HTTP Servlet container available to developers. Converged applications can also combine other protocols such as Diameter to perform advanced functions such as modifying subscriber profile data. A converged application server can, thus, deliver a converged application container, offering integrated support for Java™ EE, SIP, Web Services, and IMS standards.

Oracle Communications Converged Application Server (OCCAS) provides a carrier-grade, open, standards-based converged Web-telecom application platform based on the SIP Servlet, Java™ EE, Web Services, and IMS standards. It is designed for a wide-range of IP-based, communication-enabled applications, such as VoIP, multimedia conferencing, SIP/IMS-based call control and messaging services. OCCAS includes a converged telecommunication application framework designed to abstract the complexities of SIP Servlets and provide a set of easily usable artifacts which enable easy creation of programs without detailed knowledge of the underlying SIP level protocol and events.

OCCAS provides what are called "Communication Beans" which provide event functions. The event functions of Communication Beans handle the SIP protocol (and many other industry specifications from OMA, 3GPP and IETF) event. The developer can write logic to modify the behavior of the event functions. This is done from the perspective of modifying the behavior of "communication" it is handling rather than modifying the SIP protocol actions.

A typical telecommunication application contains not only interactions between the participants of the communication, but also activities it can carry out on a telecommunication application server. Examples of such user activities are registration and observing the status of a mailbox. However, prior to the present invention there was no Application Programming Interface (API) that treats such user activities in a generic and simplified way. Thus creating applications implementing these user activities requires detailed knowledge of the underlying SIP level protocol and events.

In accordance with embodiments of the invention the converged application framework of a converged application server is extended by providing components which encapsulate user activities in a generic and simplified way. The components are, in some embodiments, configurable using annotations or using an xml file.

In accordance with embodiments of the invention is provided with applications which allow developer implementation of user activities without detailed knowledge and/or manipulation of the underlying SIP level protocol and events.

Other objects and advantages of the present invention will become apparent to those skilled in the art from the following detailed description of the various embodiments, when read in light of the accompanying drawings.

BRIEF DESCRIPTION OF THE DRAWINGS

FIG. 3 shows a method implemented by a UserActivity Communication Bean according to an embodiment of the present invention.

DETAILED DESCRIPTION

Figure 1:
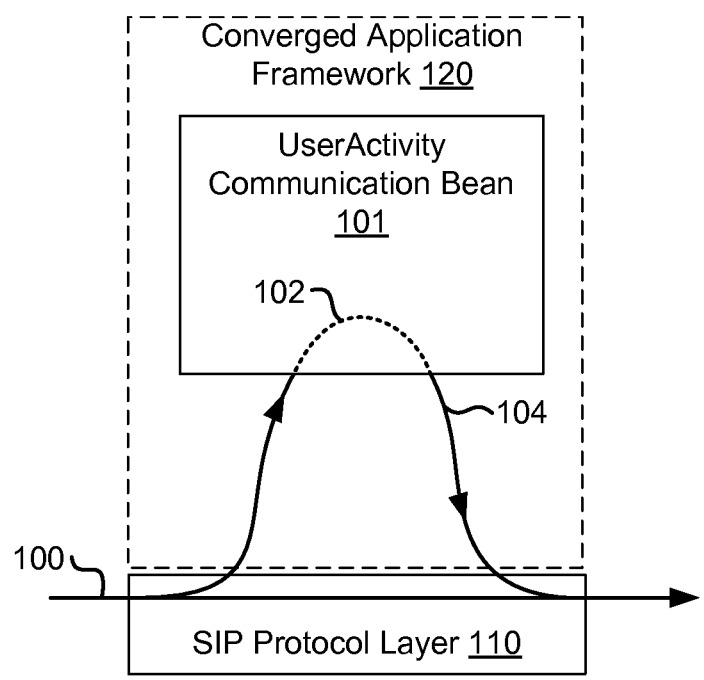
FIG. 1 shows signaling using a UserActivity Communication Bean according to an embodiment of the present invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

A typical telecommunication application contains not only interactions between the participants of the communication, but also activities it can carry out on a telecommunication application server. Examples of such activities are registration and observing the status of a mailbox, etc. The present invention provides an Application Programming Interface (API) that treats userActivities in a generic and simplified way. The application uses Session Initiated Protocol (SIP) Servlet APIs to implement these activities in a protocol centric fashion on a converged application server.

A converged telecommunication application framework is a framework designed to abstract complexities for SIP Servlets to provide a set of easily usable artifacts which enable easy creation of programs. The SIP Servlet API (application programming interface) is closely aligned with the Java™ EE specifications and it is expected that containers that host SIP Servlet applications also make Java™ EE features available to developers. The most notable of these features is the HTTP Servlet container. There are many use cases in which a converged application using both SIP and HTTP functions is required from conferencing to click-to-call applications to Presence and User Agent Configuration Management applications. Converged applications can also combine other protocols such as Diameter to perform advanced functions, for example, modifying subscriber profile data.

The SIP Servlet API also enables multiple applications to execute on the same request or response, independently of one another. This is another very powerful feature of the SIP Servlet API. It allows application developers to be able to write applications providing features that are independent of each other, but can be deployed to the same host SIP Servlet container.

Embodiments of the present invention provide a converged telecommunication application framework including a set of easily usable artifacts which enable easy creation of programs effecting user activities without detailed knowledge of the underlying SIP level protocol and events. As part of converged application framework, a new API is provided to describe a UserActivity. An ActivityParticipant initiates this UserActivity and an application (typically consisting of a Communication Bean) in the server processes the Activity. In particular embodiments the present invention provides new communication beans implementing particular userActivities.

Prior to the invention, development of an application needed to include all the SIP signaling needed for service using low level APIs. These low level APIs are adequate for very basic tasks, but higher-level building blocks are needed for more advanced tasks. This is especially true for massively concurrent applications that fully exploit today's multiprocessor and multi-core systems. Thus, one of the embodiments of this invention allows new APIs describing UserActivities to be abstracted at a very high level that are completely programmable. Ready access to these APIs reduces the cost of developing communication services significantly.

Furthermore, there are a number of specifications that each application needs to conform to, while developing communication services in general. Standard conformance is built in behind the high level APIs of this invention which ensures standards compliance. The programming APIs available prior to the invention required developers to handle the protocol level details in order to achieve the conformance which was always error prone. The programming model has built-in extensibility that allows newer user activities to be developed easily. This helps in exposing newer high level services as APIs.

FIG. 1 shows event handling in a converged application server. FIG. 1 illustrates an event 100 in the SIP Protocol Layer 110. As shown in FIG. 1, a Communication Bean 101 encapsulating a UserActivity is associated with an event 100 occurring in the SIP Protocol Layer 110. The converged application framework 120 forwards the event 100 to the Communication Bean 101. The developer can use the Communication Bean 101 to process 102 the event 100 and transmit a response 104 to the event 100 without preparing applications and SIP protocol level code to handle the SIP level communications.

Communication Bean 101 is a stateless Java™ object which can be programmed by annotations. Communication Bean 101 handles the SIP protocol (and other telecom industry specifications from OMA, 3GPP and IETF) by default and thus hides the SIP level transactions from the developer. The developer can write logic to modify the behavior of the Communication Bean 101. The behavior of the Communication Bean 101 with respect to the UserActivity can be modified using annotations embedded within the code of the Communication Bean 101 or by using a configuration file (sft.xml). The developer can thus program UserActivity features at a business logic level rather than handling SIP level transaction programming.

Figure 2:
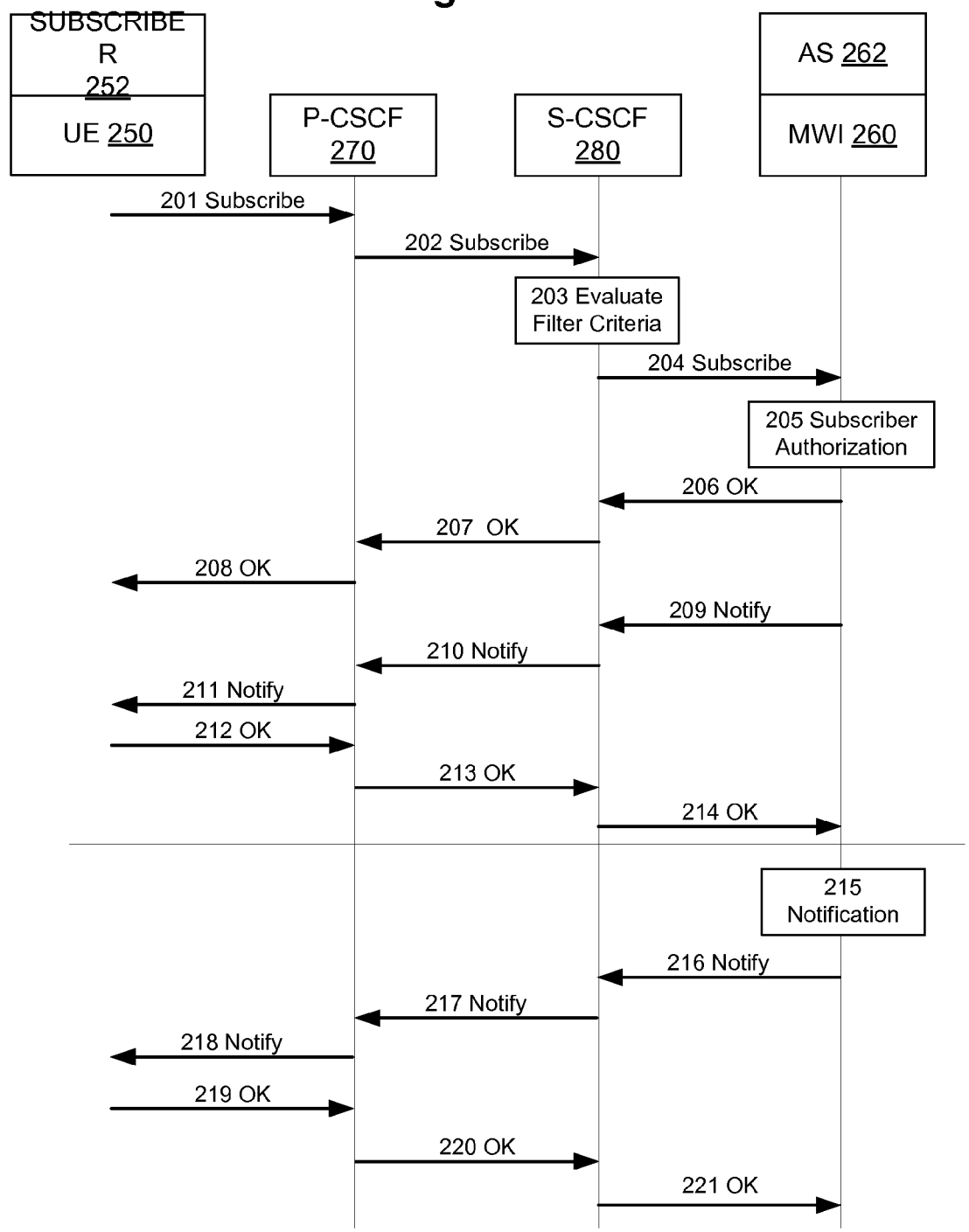
FIG. 2 shows signaling flow during initiation of a UserActivity according to an embodiment of the present invention.

FIG. 2 shows signaling flow demonstrating how User Equipment (UE) 250 of a subscriber 252 performs the User-Activity of subscribing to a Message Waiting Indication (MWI) 260. MWI 260 is a service running on an application server 262 that enables the application server 262 to indicate to the subscriber 252 that there is a message waiting. The indication is delivered to the subscriber 252 only after successful subscription to MWI 260. The signaling flow is in accordance with 3GPP TS 24.606 protocol. Message flow between user equipment 250 and MWI 260 are mediated as shown in FIG. 2.

As shown in FIG. 2, UE 250 sends a subscribe message 201 to P-CSCF (Proxy Call Session Control Function) 270, and P-CSCF 270 sends a subscribe message 202 to S-CSCF (Serving Call/Session Control Function) 280. At 203, S-CSCF 280 evaluates the subscribe message 202 according to certain filter criteria. S-CSCF 280 then sends subscribe message 204 to MWI 260 running on application server (AS) 262. In process 205, MWI 260 obtains subscriber authorization for the subscription. OK messages 206, 207, 208 are then transmitted through S-CSCF 280 and P-CSCF 270 back to user equipment 250. Notification test messages 209, 210, 211 are then transmitted through S-CSCF 280 and P-CSCF 270 back to user equipment 250. OK messages 212, 213, 214 are then transmitted through, P-CSCF 270, and S-CSCF 280 back to MWI 260 indicating success.

In transactions subsequent to subscription, a notification 215 is generated by MWI 260 in response to a message waiting condition. Notification messages 216, 217, 218 are then transmitted through S-CSCF 280 and P-CSCF 270 to user equipment 250. OK messages 219, 220, 221 are then transmitted through, P-CSCF 270 and S-CSCF 280 back to MWI 260 indicating success of the notification.

Within the converged application framework, When a SUBSCRIBE message arrives, the framework notifies an application by a communication event named SUBSCRIPTION. When detecting this event, an application can get the MessageObservation and the ActivityParticipant which is the current subscriber from the CommunicationContext.

To illustrate, MessageObservation is a child interface of UserActivity. A SIP phone sends a SUBSCRIBE SIP message to the telecommunication server to initiate this activity. Upon receiving the request, the framework which includes an embodiment of the invention will create MessageObservation as a UserActivity and will provide the UserActivity to the application. The application can then set the Message status on the UserActivity, which the framework will use to notify the SIP phone with the message summary.

```
@Context CommunicationContext<MessageObservation,
ActivityParticipant,?> ctx;
@CommunicationEvent(type =
CommunicationEvent.Type.SUBSCRIPTION)
public void hanldeSubscriptionEvent( ) {
    ActivityParticipant currentSubscriber =
    (ActivityParticipant)ctx.getParticipant( );
    currentSubscriber.setAuthorized(false);
}
```

The UserActivity API encapsulates and extends the communication. The UserActivity API has a number of ActivityParticipants.

```
package com.oracle.sft.api;
import java.util.Collection;
import com.oracle.sft.api.Communication;
/**
* This interface encapsulates the User Activity.
*
* @author Copyright (c) 2011 by Oracle. All Rights Reserved.
*/
public interface UserActivity extends Communication {
/**
```

-continued

```
* Add a <code>ActivityParticipant</code> to the UserActivity. Executing
* this method will initiate a UserActivity with that ActivityParticipant.
*
* @param name
* Name of the <code>ActivityParticipant</code>
*/
void addActivityParticipant(String name);
/**
* Add a ActivityParticipant to the UserActivity.
*
* @param p Add a ActivityParticipant to the UserActivity.
*/
void addActivityParticipant(ActivityParticipant p);
/**
* Remove the ActivityParticipant from the UserActivity.
*
* @param name
* Name of the <code>ActivityParticipant</code>
*/
void removeActivityParticipant(String name);
/**
* Remove a ActivityParticipant from the UserActivity.
*
* @param p ActivityParticipant object.
*/
void removeActivityParticipant(ActivityParticipant p);
/**
* Retrieve a <code>ActivityParticipant</code> from the UserActivity.
*
* @param name
* Name of the <code>ActivityParticipant</code>
* @return a ActivityParticipant object
*/
ActivityParticipant getActivityParticipant(String name);
/**
* Returns all Activity Participants.
*
* @return all Activity Participants.
*/
Collection<ActivityParticipant> getAllActivityParticipants( );
/**
* Process UserActivity. Subclass has its own implement.
*
*/
void process( );
}
```

According to RFC3842, a NOTIFY should be sent out when accept a new subscription, the subscription is expired or unsubscription occurs. OCCAS (Oracle™ Communications Converged Application Server) Event Notification Service sends these NOTIFY messages automatically. MWI 260 modifies the MessageSummary object in at least the first SUBSCRIPTION event to ensure the message is correct. When MWI 260 needs to send notifications, it can find the MessageObservation by resourceId via CommunicationService. With MessageObservation, MWI 260 can get the MessageSummary. After update the information, MWI 260 invokes the MessageObservation process to send NOTIFY message out.

To illustrate, MessageObservation is a child interface of UserActivity. A SIP phone sends a SUBSCRIBE SIP message to the telecommunication server to initiate this activity. Upon receiving the request, the framework which includes an embodiment of the invention will create MessageObservation as a UserActivity and will provide the UserActivity to the application. The application can then set the Message status on the UserActivity, which the framework will use to notify the SIP phone with the message summary.

```
@CommunicationBean
public class MessageObservationBean {
    @Context CommunicationContext<MessageObservation,ActivityParticipant,?> ctx;
    @Context CommunicationService service;
   @CommunicationEvent(type = CommunicationEvent.Type.SUBSCRIPTION)
    public void hanldeSubscriptionEvent( ) {
        MessageObservation messageObservation =
(MessageObservation)ctx.getCommunication( );
        MessageSummary messageSummary = messageObservation.getMessageSummary( );
messageSummary.setMessageSummaryLine(MessageContextClass.VOICEMESSAGE,1,5,
1,3);
    }
  public void updateResourceInfo(String resourceId) {
    MessageObservation messageObservation =
service.findByName(MessageObservation.class, resourceId);
    MessageSummary messageSummary = messageObservation.getMessageSummay( );
    MessageSummaryLine summaryLine =
messageSummary.getMessageSummaryLine(MessageContextClass.VOICEMESSAGE);
    summaryLine.setNewMessageCount(2);
    summaryLine.setOldMessageCount(6);
    messageObservation.process( );
  }
 }
}
```

FIG. 3 shows a method implemented by a UserActivity Communication Bean according to an embodiment of the present invention. As shown in FIG. 3, one or more SIP requests are received at step 300. The SIP requests are filtered according to selection criteria at step 302. At step 304, it is determined whether the SIP messages are indicative of a UserActivity request. If the SIP messages are indicative of a UserActivity request the UserActivity application is initiated at step 306. At step 308 the UserActivity application (UserActivity communication bean) determines the UserActivity parameters and processes the requested actions. At step 310 a response is transmitted back to the user/user equipment.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for implementing user activities in an application server of an associated telecommunication system, the method comprising:
    configuring a communication behavior portion of a user activity application by modifying one or more of an annotation within the user activity application or data of a configuration file stored in a memory of the application server;
    receiving a plurality of Session Initiation Protocol (SIP) requests;
    filtering the plurality of SIP requests in accordance with a selection criteria;
    selectively forwarding one or more of the plurality of SIP requests from a SIP protocol layer of the application server to the user activity application encapsulating a user activity and operating on one or more microprocessors in response to determining in accordance with the selection criteria that the one or more of said plurality of SIP requests represents a subscription to the user activity by a user;
    processing said subscription to said user activity with said user activity application in accordance with the modified one or more of the annotation within the user activity application or the data of the configuration file; and
    transmitting one or more SIP responses from said user activity application.

2. The method of claim 1, wherein the processing the subscription to the user activity with the user activity application comprises verifying authorization of the user to subscribe to said user activity.

3. The method of claim 1, wherein the user activity comprises subscribing to a status of a mailbox.

4. The method of claim 1, wherein the user activity comprises subscribing to a status of a mailbox and wherein the method further comprises:
transmitting the status of the mailbox to the user.

5. The method of claim 1, wherein the user activity comprises subscribing to a status of a mailbox and wherein the method further comprises:
transmitting a message waiting indication to the user.

6. The method of claim 1, wherein the user activity application is adapted to be modified using the annotation within the user activity application.

7. The method of claim 1, wherein the user activity application is adapted to be modified using the configuration file.

8. A non-transitory computer readable storage medium including instructions stored thereon which, when executed by a computer of a an application server of an associated telecommunication system, cause the computer to perform a method comprising:
configuring a communication behavior portion of a user activity application by modifying one or more of an annotation within the user activity application or data of a configuration file stored in a memory of the application server;
receiving a plurality of Session Initiation Protocol (SIP) requests;
filtering the plurality of SIP requests in accordance with a selection criteria;
selectively forwarding one or more of the plurality of SIP requests from a SIP protocol layer of the application server to the user activity application encapsulating a user activity in response to determining in accordance with the selection criteria that the one or more of said plurality of SIP requests represents a subscription to the user activity by a user;
processing said subscription to said user activity with said user activity application in accordance with the modified one or more of the annotation within the user activity application or the data of the configuration file; and
transmitting one or more SIP responses from said user activity application.

9. The non-transitory computer readable storage medium of claim 8, wherein the processing the subscription to the user activity with the user activity application comprises verifying authorization of the user to subscribe to said user activity.

10. The non-transitory computer readable storage medium of claim 8, wherein the user activity comprises subscribing to a status of a mailbox.

11. The non-transitory computer readable storage medium of claim 8, wherein the user activity comprises subscribing to a status of a mailbox and wherein the method further comprises: transmitting the status of the mailbox to the user.

12. The non-transitory computer readable storage medium of claim 8, wherein the user activity comprises subscribing to a status of a mailbox and wherein the method further comprises: transmitting a message waiting indication to the user.

13. The non-transitory computer readable storage medium of claim 8, wherein the user activity application is adapted to be modified using the annotation within the user activity application.

14. The non-transitory computer readable storage medium of claim 8, wherein the user activity application is adapted to be modified using the configuration file.

15. A system for implementing user activities in a telecommunication network, the system comprising:
an application server operating on one or more microprocessors;
wherein the application server;
configures a communication behavior portion of a user activity application by modifying one or more of an annotation within the user activity application or data of a configuration file stored in a memory of the application server;
receives a plurality of Session Initiation Protocol (SIP) requests,
filters the plurality of SIP requests in accordance with a selection criteria,
selectively forwards one or more of the plurality of SIP requests from a SIP protocol layer of the application server to the user activity application encapsulating a user activity in response to determining in accordance with the selection criteria that the one or more of said plurality of SIP requests represents a subscription to the user activity by a user,
processes said subscription to said user activity with said user activity application in accordance with the modified one or more of the annotation within the user activity application or the data of the configuration file, and
transmits one or more SIP responses from said user activity application.

16. The system of claim 15, wherein said user activity application verifies authorization of the user to subscribe to said user activity.

17. The system of claim 15, wherein the user activity comprises subscribing to a status of a mailbox.

18. The system of claim 15, wherein the user activity comprises subscribing to a status of a mailbox and wherein the application server transmits the status of the mailbox to the user.

19. The system of claim 15, wherein the user activity comprises subscribing to a status of a mailbox and wherein the application server transmits a message waiting indication to the user.

20. The system of claim 15, wherein the user activity application is adapted to be modified using the annotation within the user activity application, and the configuration file.

\* \* \* \* \*